(12) United States Patent
Tew et al.

(10) Patent No.: US 10,337,111 B2
(45) Date of Patent: Jul. 2, 2019

(54) SOLID OXIDE ELECTROCHEMICAL GAS SEPARATOR INERTING SYSTEM

(71) Applicant: Hamilton Sundstrand Corporation, Windsor Locks, CT (US)

(72) Inventors: David E. Tew, Fairfield, CT (US); Stephen E. Tongue, Hampden, MA (US); Jonathan Rheaume, West Hartford, CT (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/969,398

(22) Filed: Dec. 15, 2015

(65) Prior Publication Data
US 2017/0167036 A1 Jun. 15, 2017

(51) Int. Cl.
| C25B 9/10 | (2006.01) |
| C25B 1/02 | (2006.01) |
| C25B 9/18 | (2006.01) |
| C25B 11/04 | (2006.01) |
| C25B 13/04 | (2006.01) |
| C25B 15/08 | (2006.01) |

(Continued)

(52) U.S. Cl.
CPC .............. *C25B 9/10* (2013.01); *B01D 53/326* (2013.01); *B64D 37/32* (2013.01); *C25B 1/02* (2013.01); *C25B 9/18* (2013.01); *C25B 11/0426* (2013.01); *C25B 13/04* (2013.01); *C25B 15/02* (2013.01); *C25B 15/08* (2013.01); *B01D 2256/10* (2013.01); *B01D 2257/104* (2013.01); *B01D 2259/4575* (2013.01); *Y02P 20/129* (2015.11)

(58) Field of Classification Search
CPC .............. B01D 53/326; B01D 2256/10; B01D 2257/104; B01D 2259/4575; B64D 37/32; C25B 1/02; C25B 9/10; C25B 9/18; C25B 11/0426; C25B 13/04; C25B 15/02; C25B 15/08; Y02P 20/129
See application file for complete search history.

(56) References Cited

U.S. PATENT DOCUMENTS

| 5,169,415 A | 12/1992 | Roettger et al. |
| 5,332,483 A | 7/1994 | Gordon |

(Continued)

FOREIGN PATENT DOCUMENTS

| EP | 2927130 A1 | 10/2015 |
| WO | 2013140312 A2 | 9/2013 |

(Continued)

OTHER PUBLICATIONS

Extended European Search Report for EP Application No. 16202289.1, dated Jan. 30, 2017, 7 pages.

*Primary Examiner* — Ciel P Thomas
(74) *Attorney, Agent, or Firm* — Kinney & Lange, P.A.

(57) ABSTRACT

An air inert gas generating system consists of heat exchangers, a heating element, and a plurality of solid oxide electrochemical gas separator (SOEGS) cells. The SOEGS cells are interconnected in series to create a stack. A voltage is applied to the stack causing oxygen ions to be transported from the air flowing through the cathode through the electrolyte to the anode side of the SOEGS, resulting in oxygen-depleted gas. The oxygen-depleted gas can be used to inert the ullage of aircraft fuel tank or support the fire suppression system in the cargo hold. The oxygen-enriched gas can be used for other purposes.

7 Claims, 6 Drawing Sheets

(51) Int. Cl.
  *C25B 15/02* (2006.01)
  *B01D 53/32* (2006.01)
  *B64D 37/32* (2006.01)

(56) References Cited

U.S. PATENT DOCUMENTS

| | | | |
|---|---|---|---|
| 5,643,355 | A | 7/1997 | Phillips et al. |
| 8,568,934 | B2 | 10/2013 | Naeve et al. |
| 8,925,865 | B2 | 1/2015 | Stolte et al. |
| 9,118,054 | B2 | 8/2015 | Gummalla et al. |
| 9,580,177 | B2 | 2/2017 | Kshirsagar et al. |
| 9,623,981 | B2 | 4/2017 | Darling et al. |
| 2003/0022048 | A1 | 1/2003 | Meixner |
| 2006/0130462 | A1 | 6/2006 | Wancura |
| 2008/0047502 | A1* | 2/2008 | Morse ................ C25B 1/12 123/3 |
| 2008/0202774 | A1 | 8/2008 | Kotliar |
| 2008/0292922 | A1 | 11/2008 | Fischer |
| 2013/0200216 | A1 | 8/2013 | Mock et al. |
| 2014/0255733 | A1 | 9/2014 | Masset et al. |
| 2014/0272734 | A1* | 9/2014 | Braun ................ C10K 1/04 431/11 |
| 2015/0333347 | A1 | 11/2015 | Brunaux et al. |
| 2016/0201983 | A1 | 7/2016 | Sharma |
| 2017/0167036 | A1 | 6/2017 | Tew et al. |

FOREIGN PATENT DOCUMENTS

| | | | |
|---|---|---|---|
| WO | 2014111861 | A1 | 7/2014 |
| WO | 2014186881 | A1 | 11/2014 |

\* cited by examiner

SOLID OXIDE ELECTROCHEMICAL GAS SEPARATOR INERTING SYSTEM

BACKGROUND

Fuel tanks can contain potentially combustible combinations of fuel vapors, oxygen, and ignition sources. To prevent combustion, inert gas, such as nitrogen-enriched air (NEA) or oxygen-depleted air (ODA), is introduced into the ullage of a fuel tank, in order to keep the oxygen concentration in the ullage below 12%. A variety of membrane-based technologies have conventionally been used to inert fuel tank air. Similarly, fire suppression systems, such as fire suppression systems deployed in aircraft cargo holds, can function with inert gas.

SUMMARY

In one embodiment, an electrochemical gas separation system includes an inlet configured to receive incoming process air, a plurality of solid oxide electrochemical gas separator cells for reducing incoming process air, a plurality of interconnectors, a plurality of end portions, a power source and an outlet configured to release oxygen-depleted air. Each of the plurality of solid oxide electrochemical gas separator cells includes a cathode for receiving heated process air and reducing oxygen, an anode for receiving oxygen ions and potentially a cooling fluid flow, and an electrolyte for conducting oxygen ions from the cathode to the anode. The solid oxide electrochemical gas separator is configured to release oxygen-depleted air from the cathode and oxygen-enriched air from the anode. The plurality of interconnectors electrically link each of the plurality of solid oxide electrochemical gas separators in series and they physically separate the gases flowing through adjacent anodes and cathodes. The plurality of end portions are attached to either end of each of the plurality of solid oxide electrochemical gas separators. The inlet and outlet are attached to the system to facilitate the introduction of fresh air as well as the removal of air which will be depleted of oxygen in the plurality of solid oxide electrochemical gas separators.

In another embodiment, a method of generating oxygen-depleted air includes the temperature-conditioning of incoming process air and then the routing of the heated process air to a plurality of solid oxide electrochemical gas separator cells. The heated process air is depleted of oxygen in the plurality of solid oxide electrochemical gas separator cells wherein electrochemical reactions result in the reduction of oxygen molecules in the air to oxygen ions which are subsequently conducted across the electrolytes of the plurality of solid oxide electrochemical gas separator cells from the cathode to the anode where they oxidize to evolve oxygen molecules. Resulting oxygen-depleted air is flowed to use in a second location. Resulting oxygen-enriched air is flowed to an outlet.

DETAILED DESCRIPTION

The present disclosure describes a system and method to generate inert gas for use in combustion prevention and fire suppression. In particular, the system can be applied to fuel tank inerting or to fire suppression for aircraft cargo areas, dry bays, and other areas that require fire protection. The system uses solid oxide electrochemical gas separators (SOEGS) cells configured to transport oxygen out of incoming process air, resulting in inert oxygen-depleted air. The use of SOEGS cells is beneficial for purposes of energy efficiency and lower system weight. In addition, the replacement of ozone-depleting organic halides such as Halon that are used as fire extinguishing agents on aircraft with an inert gas generation system is more environmentally benign.

Ceramic solid oxide fuel cells have been leveraged in a variety of systems. Generally, past uses configure the system as a fuel cell for producing electrical current. In this configuration, both fuel and air are fed into the cells, resulting in a voltage difference across the cell that can be used to generate an electric current. In this traditional configuration, the cathode of the fuel cell is positive, while the anode of the fuel cell is negative. In similar configurations, solid oxide systems have been used to accomplish electrolysis of water or carbon dioxide, splitting the water or carbon dioxide into separated components. However, solid oxide technology has scarcely been used in a "reverse" or "gas separator" configuration.

Rarely have ceramic solid oxide cells been used as solid oxide electrochemical gas separators (SOEGS). In a gas separator configuration, the polarity of the cell flips. The cathode is negative, and the anode is positive. Nonetheless, the anode is the site of oxidation and the cathode is the site of reduction. When a solid oxide cell is used in such a configuration, instead of generating a current, the SOEGS generates oxygen-depleted air. In the SOEGS configuration, an applied DC voltage induces a current that causes incoming oxygen to reduce in the cathode and be transported through the oxygen-conducting electrolyte to the anode.

The use of SOEGS has several benefits. First, the use of an SOEGS is more energy efficient than the use of other types of electrochemical gas separators, such as a proton exchange membrane. Second, the use of SOEGS has the potential to decrease the weight of the inert gas and fire suppression systems. Finally, the proposed SOEGS gas separation system exhaust comes out dry with no need to remove humidity from the system, as compared to proton exchange membrane gas separator systems.

Figure 1:
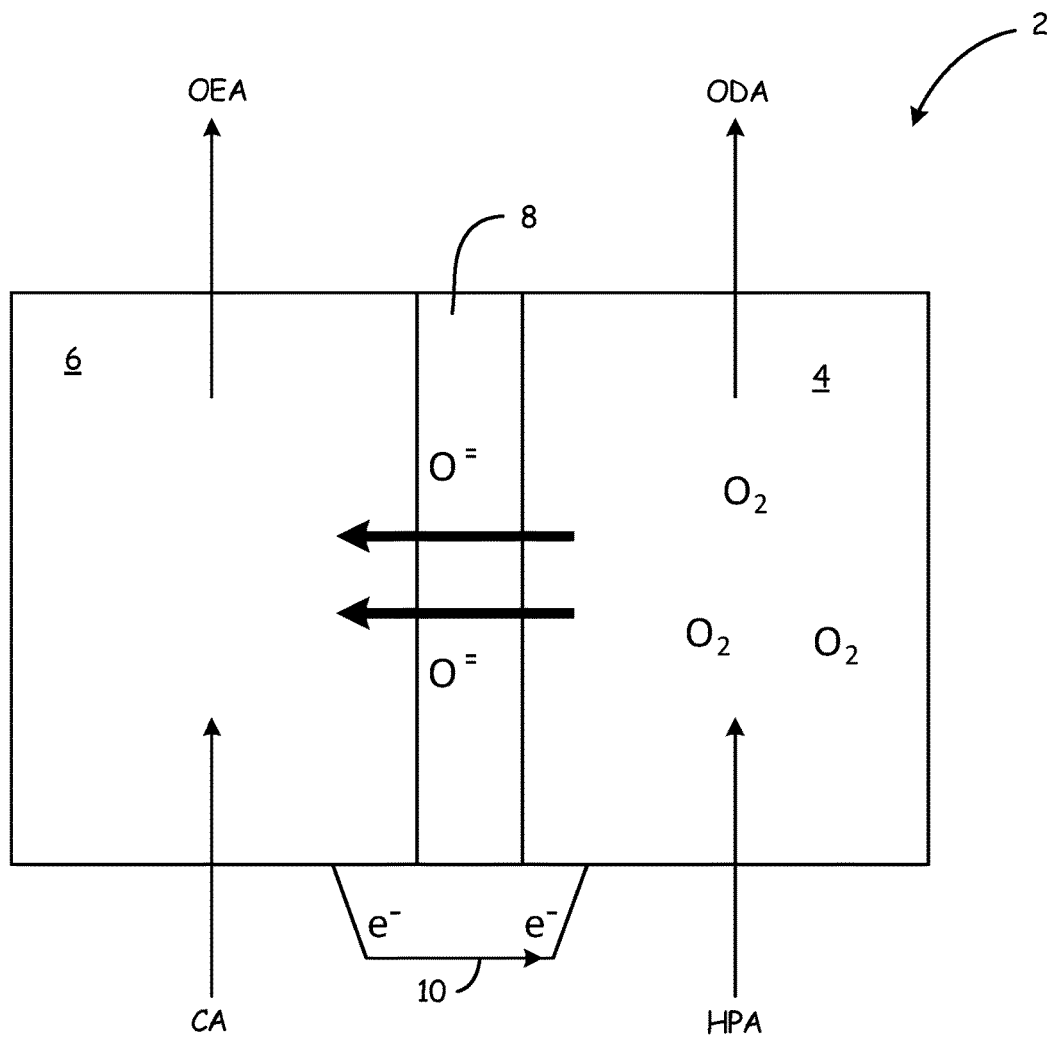
FIG. 1 is a schematic diagram of a single solid oxide electrochemical gas separator cell.

FIG. 1 is a schematic diagram of solid oxide electrochemical gas separator (SOEGS) cell 2. The diagram of SOEGS cell 2 includes cathode 4, anode 6, electrolyte 8, bias voltage 10, heated process air (HPA), cooling air (CA), oxygen-depleted air (ODA), oxygen-enriched air (OEA), oxygen molecules ($O_2$), oxygen ions ($O^=$), and electrons ($e^-$). Cathode 4 and anode 6 are separated by electrolyte 8, which may be a film. Cathode 4 and anode 6 are thus separated from each other, but bias voltage 10 is run across SOEGS cell 2 from anode 6 to cathode 4, electrically connecting anode 6 and cathode 4.

Cathode 4 and anode 6 are generally made of ceramic material such as lanthanum strontium manganite, lanthanum strontium cobalite, and lanthanum strontium cobalt ferrite; or composite material such as noble metal supported on a ceramic substrate. Electrolyte 8 is an oxygen ion conductor, such as yttria-stabilized zirconia or ceria doped with rare earth metals. Electrolyte 8 can be a thin film between anode 6 and cathode 4, while anode 6 and cathode 4 may consist of porous ceramic materials that can support the electrolyte. When SOEGS cell 2 is running, a bias voltage 10 of about 1 V per SOEGS cell is applied across SOEGS cell 2 from anode 6 to cathode 4. Incoming heated process air (HPA) is heated outside the SOEGS (see FIG. 4A-4D), and is run through cathode 4. Oxygen molecules ($O_2$) in heated process air are reduced in cathode 4. Resulting oxygen ions ($O^=$) are conducted through electrolyte 8 to anode 6. Heated process air becomes oxygen-depleted air (ODA) as oxygen ions are conducted to anode 6. Thus, oxygen-depleted air exits cathode 4. Oxygen-depleted air has less than 12% oxygen content by volume, and is used to inert a fuel tank or in a fire suppression system.

While SOEGS cell 2 is running, cooling air (CA) is flowed through anode 6 to reject waste heat from SOEGS cell 2. The difference in temperature between the sides of the SOEGS should be no more than approximately 200 degrees Celsius to prevent mechanical failure due to thermally induced stresses. Cooling air exits anode 6 along with oxygen that is evolved at anode 6; this flow stream contains oxygen molecules previously removed from the incoming heated process air in cathode 4.

Specifically, when heated process air enters cathode 4, the oxygen in heated process air reacts with electrons ($e^-$) from applied bias voltage 10 in the following reaction:

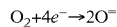

$$O_2 + 4e^- \rightarrow 2O^=$$

The resulting oxygen ions are transported across electrolyte 8 where they recombine into oxygen molecules and electrons in the following reaction:

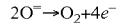

$$2O^= \rightarrow O_2 + 4e^-$$

Thus, air leaving anode 6 contains additional oxygen molecules and is oxygen-enriched air.

FIG. 1 shows a single solid oxide electrochemical gas separator cell. However, the use of a single SOEGS cell would not be a practical means for the inerting of air for use in a combustion prevention or suppression application. For this reason, a plurality of SOEGS cells are, connected in series. The plurality of SOEGS cells is referred to as a "stack" of SOEGS cells. There are two types of shapes in which SOEGS cells can be formed and stacked: planar SOEGS cells and tubular SOEGS cells.

Figure 2A:
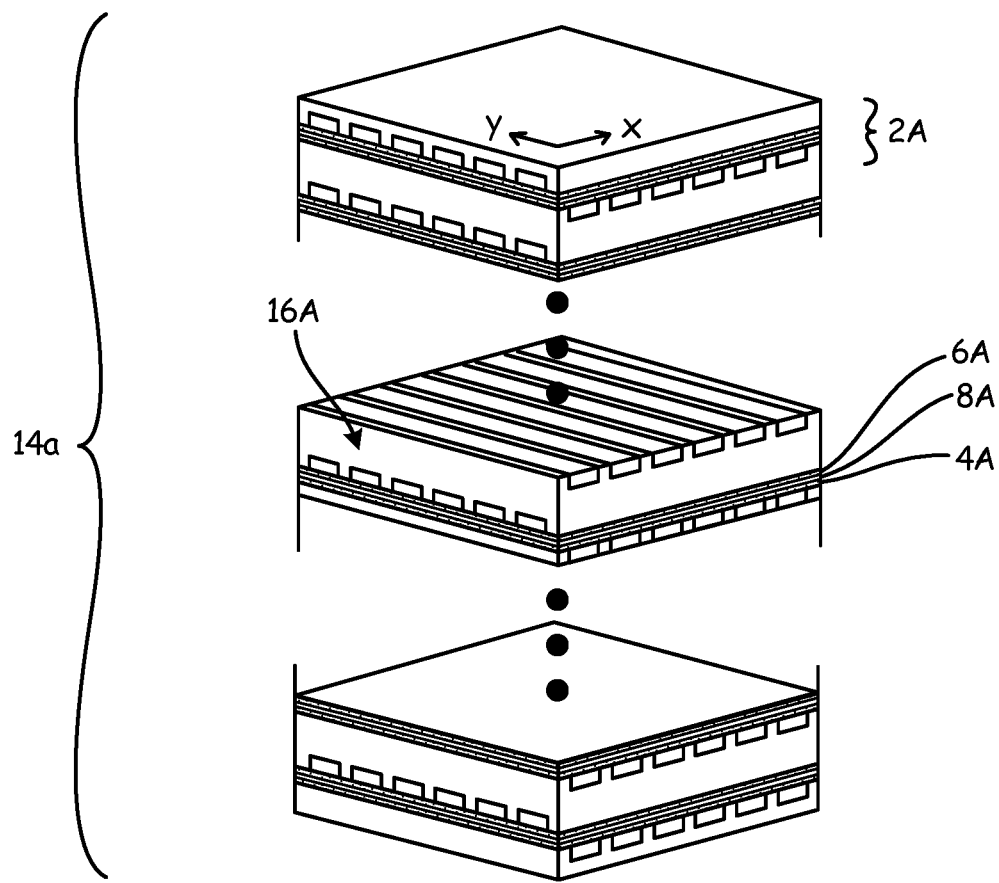
FIG. 2A is an exploded view of a planar solid oxide electrochemical gas separator stack.
Figure 2B:
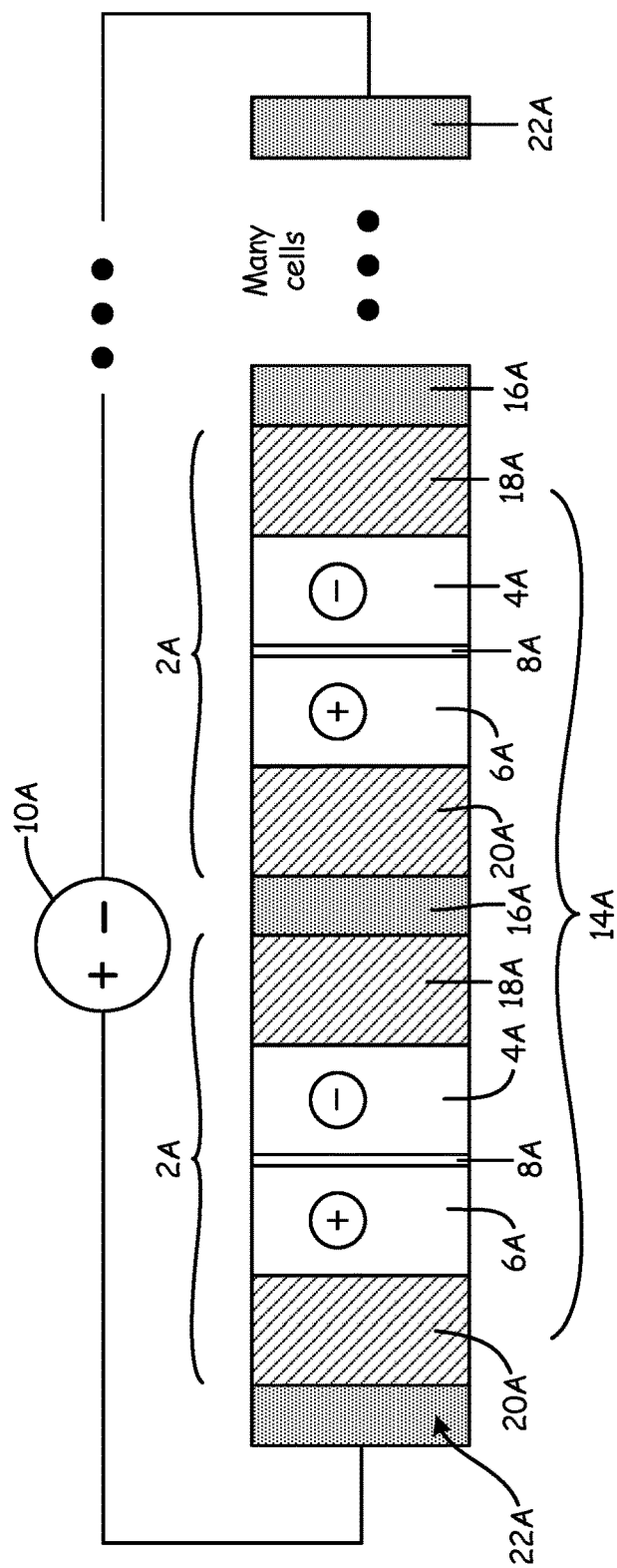
FIG. 2B is a schematic diagram of a planar solid oxide electrochemical gas separator stack.

FIGS. 2A and 2B are depictions of planar SOEGS stacks. Planar SOEGS stack includes SOEGS cells 2A, each comprising cathode 4A, anode 6A and electrolyte 8A; in addition to interconnectors 16A, cathode flow fields 18A, anode flow fields 20A, and end portions 22A. In planar SOEGS stack 14A, cathode 4A and anode 6A are flat ceramic layers stacked adjacent to one another, with electrolyte 8A in between. Each SOEGS planar cell 2A is stacked adjacent to neighboring SOEGS planar cells 2A, with interconnectors 16A in-between each cell 2A, providing an electrical connection between cells 2A in series.

FIG. 2A is an exploded view of planar SOEGS stack 14A. Planar SOEGS stack 14A is the first configuration for SOEGS. In the planar configuration, SOEGS stack 14A is created by stacking planar SOEGS cells adjacent to each other. Planar SOEGS cell 2A is comprised of layers anode 6A, electrolyte 8A, and cathode 4A, each adjacent to each other. SOEGS stack 14A is comprised of multiple SOEGS cells 2A, interconnected by inter-connectors 16A, which connect SOEGS cells 2A by connecting anode 6A of a first SOEGS cell 2A to cathode 4A of a second SOEGS cell 2A. Incoming heated process air flows orthogonal into SOEGS stack 14A.

FIG. 2B is a block diagram of planar SOEGS stack 14A. SOEGS stack 14A is comprised of a plurality of SOEGS cells 2A which are planar. Each SOEGS cell 2A includes cathode 4A, electrolyte 8A, and anode 6A. Bias voltage 10A is applied across each cell in cylindrical SOEGS stack 14A. Each SOEGS cell 2A also includes anode flow field 20A through which cooling air (CA) flows and cathode flow field 18A through which heated process air (HPA) runs. SOEGS stack 14A must be thermally managed to prevent ceramic shock. SOEGS stack 14A will generate heat during operation, so provisions to cool the device are needed. SOEGS stack 14A may be cooled via cooling air (CA) through anode side 6A of SOEGS stack 14A. Each SOEGS cell 2A is interconnected to adjacent SOEGS cells 2A through bipolar plate interconnectors 16A. The plurality of SOEGS cells 2A are connected in series and are bookended by end portions 22A. End portions 22A close off cell stack 14A. The stacking of planar cells in series saves significant space in a system.

Figure 3A:
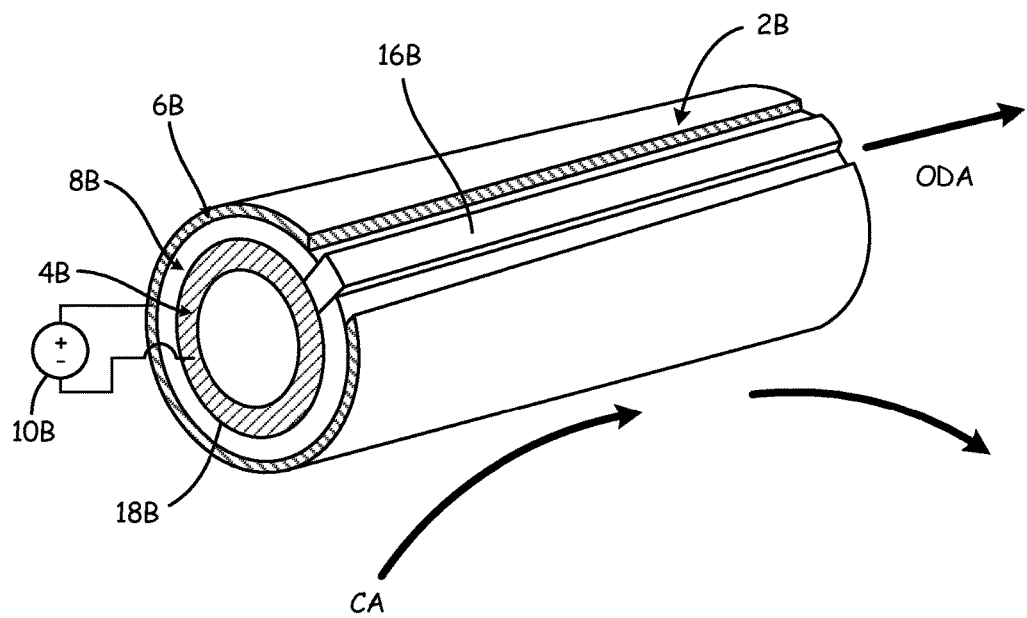
FIG. 3A is a perspective view of a single tubular solid oxide electrochemical gas separator cell.
Figure 3B:
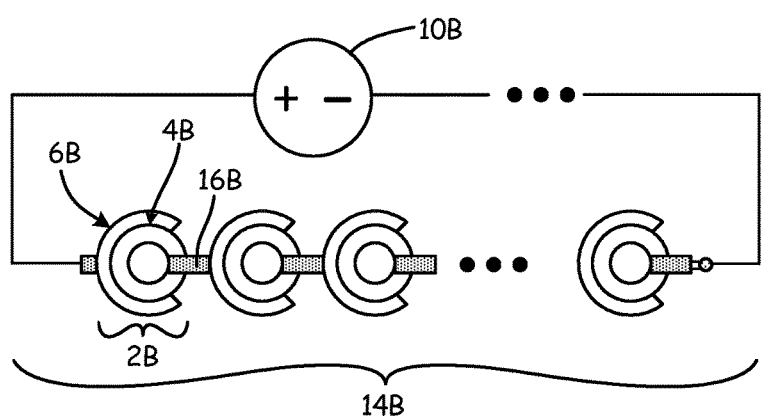
FIG. 3B is a block diagram of a tubular solid oxide electrochemical gas separator stack.

FIGS. 3A and 3B are depictions of tubular SOEGS cell 2B and SOEGS stacks 14B, respectively. Tubular SOEGS stack includes SOEGS cells 2B, each comprising cathode 4B, anode 6B and electrolyte 8B; in addition to interconnectors 16B and cathode flow fields 18B. Tubular SOEGS cell 2B contains the same components as planar cell 2A, but in a slightly different configuration. Anode 6B and cathode 4B are folded over each other to create a cylinder, where anode 6B is on the outside. Electrolyte 8B is a layer in-between cathode 4B and anode 6B. In tubular SOEGS stack 14B, each SOEGS cell 2B is cylindrical in shape, so individuals cells 2B cannot be stacked like planar cells 2A. Instead, tubular cells 2B are connected from cathodes 4B of one cell via interconnectors 16B to anodes 6B of an adjacent cell, and are lined up in series.

FIG. 3A is a perspective view of singular tubular SOEGS cell 2B. Tubular SOEGS cell 2B is comprised of anode 6B on the outside of cylindrical SOEGS cell 2B, oxygen ion-conducting electrolyte 8B adjacent to anode 6B, and cathode 4B adjacent to electrolyte 8B. Heated process air (HPA) is flowed through the center of cylindrical SOEGS cell 2B, inside cathode 4B. Cooling air (CA) is flowed on the outside of anode 6B external to cylindrical SOEGS cell 2B. Bias voltage 10B is applied across cylindrical SOEGS cell 2B from anode 6B to cathode 4B. Oxygen-depleted air (ODA) flows out of the center of cylindrical SOEGS cell 2B, while oxygen-enriched air (OEA) flows outside of anode 6B.

FIG. 3B is a block diagram of tubular SOEGS stack 14B. Tubular SOEGS stack 14B consists of a plurality of tubular SOEGS cells 2B which are interconnected. In this tubular stack concept, cathode 4B of the first tubular SOEGS cell 2B is in electrical connection with anode 6B of second tubular SOEGS cell 2B. The plurality of SOEGS cells 2B are connected in series. Bias voltage 10B is applied across tubular SOEGS stack 14B. The heated process air (HPA) entering the stack flows in one end of the tubular cells 2B, parallel to the tubes themselves. While both planar and tubular geometric configurations are potential stack configuration options, the application of one embodiment rather than the other may be more beneficial depending on available space, manufacturing costs, and performance requirements.

A plurality of SOEGS cells 2 arranged in SOEGS stacks 14A, 14B can be used to produce enough oxygen-depleted air for use in aircraft systems through the chemical reactions described in reference to FIG. 1. FIGS. 4A-4D describe the use of SOEGS system 26 leveraging SOEGS stack 14 (which can be in planar, tubular, or other appropriate configuration) to create oxygen-depleted air for use in combustion prevention and fire suppression applications.

Figure 4A:
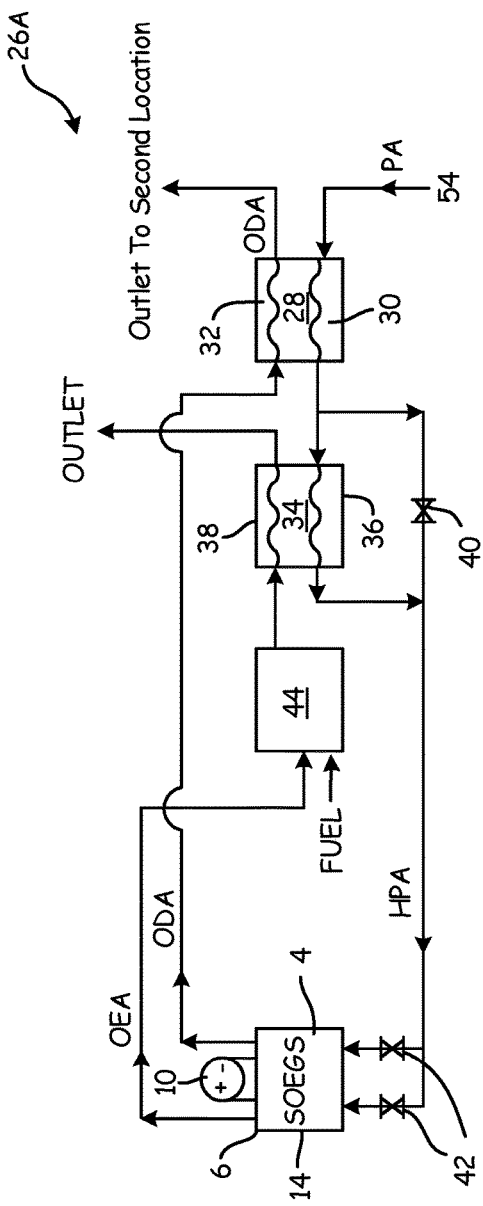
FIG. 4A is a schematic diagram of a solid oxide electrochemical gas separator system.

FIG. 4A is a schematic diagram of an SOEGS system 26A in an aircraft. SOEGS system 26A includes cathode heat recovery heat exchanger 28 with sides 30 and 32, anode heat recovery heat exchanger 34 with sides 36 and 38, bypass valve 40, flow control valves 42, SOEGS stack 14, applied bias voltage 10, burner 44, and inlet 54. SOEGS system 26A is arranged so inputted process air flows into inlet 54, to cathode heat recovery heat exchanger 28, through anode heat recovery heat exchanger 34, through valves 40, 42, to SOEGS stack 14, then oxygen-enriched air is routed through burner 44 and heat exchanger 34 before being sent elsewhere, while oxygen-depleted air returns through heat exchanger 28 before being sent through the outlet to a second location, to be used in a second location (such as a fuel tank ullage) as inert gas.

In SOEGS system 26A, process air (PA) enters the system through inlet 54 and continues to cathode heat recovery heat exchanger 28. Process air can be bleed air, compressed air, cabin air, ram air or fan air. Incoming process air should be purified (not pictured) to remove impurities prior to entering the system, and may have to be mechanically compressed (not pictured) if it is ram air or fan air. Incoming process air contains higher than 12% oxygen upon entering the system, but must be temperature-conditioned before being reduced in SOEGS stack 14.

Thus, heat exchangers 28, 34, flow control valves 40, 42, and burner 44 are in SOEGS system 26 to temperature control incoming process air. Process air first enters cathode heat recovery heat exchanger 28. Cathode heat recovery heat exchanger 28 has two sides: cold side 30 and hot side 32. Process air enters cathode heat recovery heat exchanger 28 in cold side 30, where process air is heated range of at least 500 degrees Celsius and no more than 1000 degrees Celsius. Ideally, process air is heated to a temperature of approximately 650-850 degrees Celsius. If process air is too cold, the kinetics of the reaction in the solid oxide electrochemical gas separator cells will be affected. If process air is too hot, then the longevity and consistency of the solid oxide electrochemical gas separator cells may be compromised due to the microstructural aging of the ceramic materials. Temperatures outside the ideal range will cause downgraded performance of the solid oxide electrochemical gas separator system.

Heated process air (HPA) is then either routed to anode heat recovery heat exchanger 34 for further temperature conditioning, or through bypass valve 40. Anode heat recovery heat exchanger 34 consists of two sides: cold side 36 and hot side 38. If heated process air enters anode heat recovery heat exchanger, then heated process air goes in anode heat recovery heat exchanger 34 cold side 36 where heated process air is further temperature-conditioned before flowing to SOEGS stack 14. If heated process air is routed through bypass valve 40, then it can mix with heated process air from anode heat recovery heat exchanger 34 cold side 36 in order to temperature-control gases to SOEGS stack 14. Flow of heated process air into SOEGS stack 14 can be regulated by flow control valves 42.

Heated process air exits anode heat recovery heat exchanger cold side 36 and is routed to solid oxide electrochemical gas separator (SOEGS) stacks 14. Flow of heated process air into SOEGS stack 14 is regulated by flow control valves 42. Heated process air is flowed through SOEGS stack 14 cathode side 4, while cooling air (CA) is flowed through SOEGS stacks anode side 6. Cooling air is used to maintain thermal balance inside SOEGS stack 14 and control temperature of incoming heated process air. Power source (typically a bias voltage) 10 produces a DC current, resulting in oxygen molecules in heated process air reducing, and subsequent oxygen ions moving from heated process air in cathode 4 through electrolyte 8 to anode 6. The chemical reactions which occur in cathode 4 and anode 6 are described in detail with reference to FIG. 1.

Air leaving cathode 4 is oxygen-depleted air (ODA). Air leaving anode 6 is oxygen-enriched air (OEA). Oxygen-depleted air is inert air with an oxygen content below 12%. Oxygen-depleted air is routed back to cathode heat recovery heat exchanger 28, where oxygen-depleted air passes through cathode heat recovery heat exchanger 28 hot side 32 and is cooled to a temperature safe for use in inerting applications. Failure to cool oxygen-depleted air may result in damage to other materials, structures, and equipment when used for inerting applications. Preferably, oxygen-depleted air is cooled to ambient temperature, however, cooling to a temperature below 80 degrees Celsius for safe use with tank structural materials is acceptable. Oxygen-depleted air is then routed out of SOEGS system 26 through outlet to a second location, where ODA will be used to inert fuel tanks or in cargo hold fire suppression (not pictured).

Oxygen-enriched air exiting SOEGS stack 14 is discarded through an outlet (e.g., overboard) if it is first flowed to burner 44. Burner 44 is fed by fuel from a fuel tank (not pictured). Burner 44 heats oxygen-enriched air (OEA) to a range of 500-1100 degrees Celsius. The heated gas may then be routed back through anode heat recovery heat exchanger 34 hot side 38, where oxygen-enriched air is cooled by transferring its heat to process air which is heated to the range of 650-850 degrees Celsius. Heated air is then routed out of anode heat recovery heat exchanger 34 towards SOEGS stacks 14 as incoming heated process air. Simultaneously, oxygen-enriched air exiting anode heat recovery heat exchanger 34 hot side 38 leaves the system through an outlet.

Figure 4B:
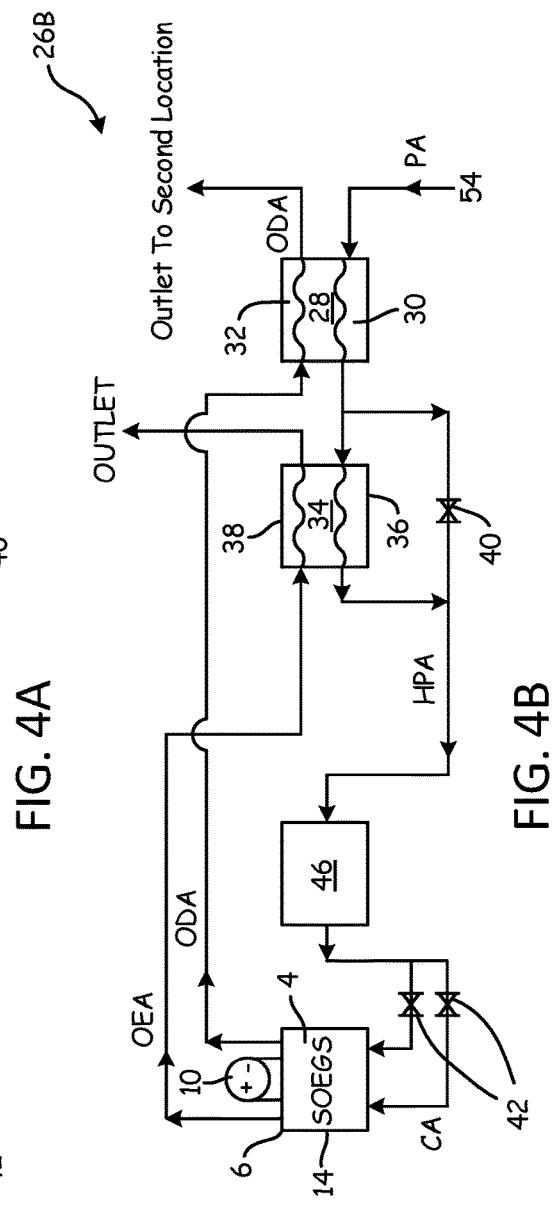
FIG. 4B is a schematic diagram of a solid oxide electrochemical gas separator system in another embodiment which features an electrical heater.
Figure 4C:
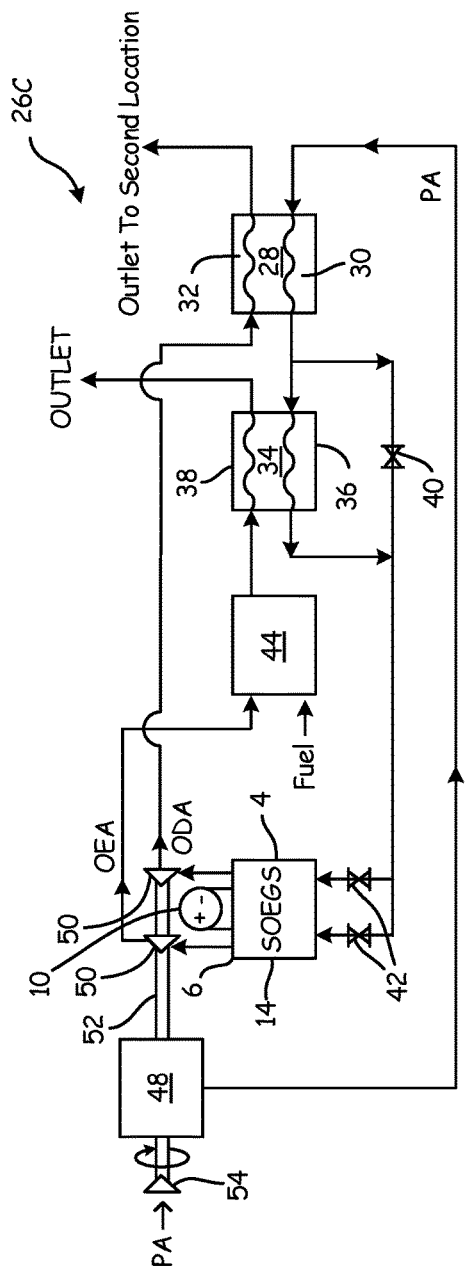
FIG. 4C is a schematic diagram of a solid oxide electrochemical gas separator system in another embodiment which features a motor-assisted turbocharger.
Figure 4D:
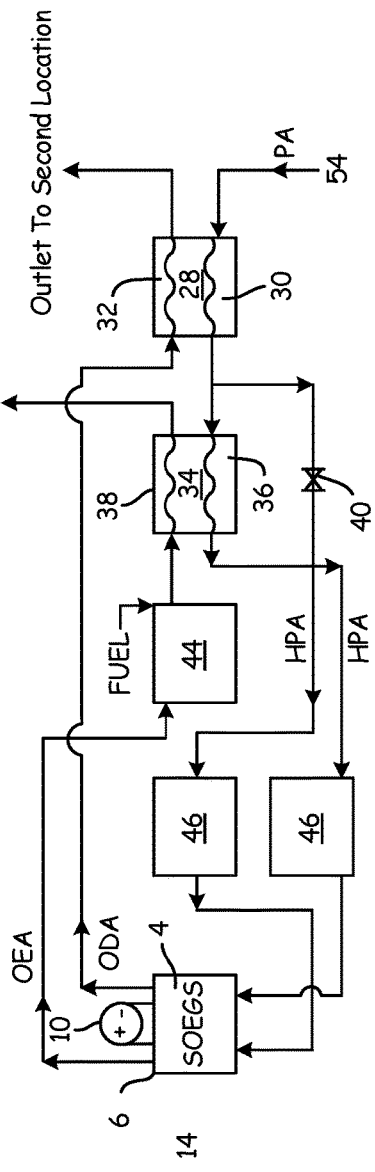
FIG. 4D is a schematic diagram of a solid oxide electrochemical gas separator system in another embodiment which includes a burner and an electrical heater.

FIGS. 4B, 4C, and 4D are alternative embodiments of the SOEGS system shown in FIG. 4. The components of FIGS. 4B, 4C, and 4D are the same as those described in FIG. 4A, and are connected in the same fashion, except where otherwise described here. FIG. 4B does not contain burner 44 described in FIG. 4A. Instead, FIG. 4B contains electrical heater 46, which heats process air as it flows to SOEGS stack 14.

FIG. 4C includes motor-assisted turbocharger 48, which pressurizes incoming process air before process air is temperature-conditioned in heat exchangers 28, 34. In this configuration, process air enters inlet 54 and is pressurized by motor-assisted turbocharger 48, before process air flows to cathode heat recovery heat exchanger 28. Motor-assisted turbocharger 48 is powered by turbines 50 and shaft 52 which are fed by oxygen-depleted air from SOEGS system 14.

FIG. 4D contains both burner 44, as described in reference to FIG. 4A, and electrical heaters 46. Both heating elements 44, 46, temperature-control air. Burner 44 heats oxygen-enriched air (OEA) exiting SOEGS stack 14, while electrical heaters 46 heat process air flowing towards SOEGS stack 14.

Discussion of Possible Embodiments

The following are non-exclusive descriptions of possible embodiments of the present invention.

A gas inerting system according to an exemplary embodiment of this disclosure, among other possible things includes an inlet for receiving process air, a plurality of solid oxide electrochemical gas separator cells, a plurality of interconnectors, a plurality of end portions, a power source, and an outlet. The plurality of solid oxide electrochemical gas separator cells each comprise a cathode configured for receiving heated process air, an anode configured for receiving oxygen ions, and an electrolyte comprising an oxygen ion conductor, where the electrolyte is configured to conduct oxygen ions that have been removed from the process air when a bias voltage is applied from the anode to the cathode.

The gas inerting system of the preceding paragraph can optionally include, additionally and/or alternatively, any one or more of the following features, configurations and/or additional components:

The system includes a cathode heat recovery heat exchanger and an anode heat recovery heat exchanger. The cathode heat recovery heat exchanger further comprises a cold side configured to receive and heat process air, and a hot side configured to receive and cool oxygen-depleted air from the plurality of solid oxide electrochemical gas separator cells. The anode heat recovery heat exchanger further comprises a cold side configured to receive and heat process air from the cathode heat recovery heat exchanger, and a hot side configured to receive and cool oxygen-enriched air.

The incoming process air is selected from the group consisting of bleed air, compressed air, ram air, cabin air, and fan air.

The cathode and the anode are comprised of material from the group consisting of ceramic materials or noble metals supported on ceramic substrates.

The plurality of solid oxide electrochemical gas separator cells are each planar in shape and are arranged in one or more crossflow stacks which are interconnected.

The plurality of solid oxide electrochemical gas separator cells are each tubular in shape, and are arranged in one or more crossflow stacks which are interconnected.

The system includes a heating element, wherein the heating element may consist of one or more electrical heaters configured to receive heated process air or a burner configured to receive and heat oxygen-enriched air from the plurality of solid oxide electrochemical gas separator cells through the burning of fuel.

The system includes an element configured to pressurize process air, wherein the element consists of a motor-assisted turbocharger or a compressor.

A method of generating oxygen-depleted air according to an exemplary embodiment of this disclosure, among other possible things includes routing incoming process air into a plurality of solid oxide electrochemical gas separator cells, each having a cathode configured for receiving the heated process air, an anode configured for receiving oxygen ions, and an electrolyte comprising an oxygen ion conductor, the cathode configured to reduce oxygen from the process air when a bias voltage is applied from the anode to the cathode; selectively routing resulting oxygen-enriched air out of the plurality of solid oxide electrochemical gas separator cells; temperature-conditioning the oxygen-enriched air; routing the oxygen-enriched air to an outlet; selectively routing resulting oxygen-depleted air out of the plurality of solid oxide electrochemical gas separator cells; temperature-conditioning outgoing oxygen-depleted air; and flowing the temperature-conditioned oxygen-depleted air to a second location.

The method of the preceding paragraph can optionally include, additionally and/or alternatively, any one or more of the following features, configurations and/or additional components:

The method includes routing incoming process air into a first side of a cathode heat recovery heat exchanger, wherein the first side is configured to heat the process air; selectively routing the heated process air from the first side of the cathode heat recovery heat exchanger to a first side of an anode heat recovery heat exchanger, where the first side is configured to heat the air; flowing the heated process air from the first side of the anode heat recovery heat exchanger through the plurality of solid oxide electrochemical gas separator cells, selectively routing resulting oxygen-depleted air from the plurality of solid oxide electrochemical gas separator cells through a second side of the cathode heat recovery heat exchanger, wherein the second side is configured to cool the air; flowing the cooled oxygen-depleted air out of the second side of the cathode heat recovery heat exchanger to a second location; selectively routing resulting oxygen-enriched air to a second side of the anode heat recovery heat exchanger, wherein the second side is configured to cool the air; and flowing the cooled oxygen-enriched air from the second side of the anode heat recovery heat exchanger to an outlet.

The process air is heated to at least 500 degrees Celsius and no more than 1000 degrees Celsius while exiting the cathode heat recovery heat exchanger.

The heated process air is routed through a bypass valve downstream of the first side of the cathode heat recovery heat exchanger, wherein the bypass valve is configured to allow heated process air to flow into the first side of the anode heat recovery heat exchanger, or alternatively to flow directly to the plurality of solid oxide electrochemical gas separator cells.

The heated process air flows through at least one electrical heater downstream of the anode heat recovery heat exchanger but upstream of the plurality of solid oxide electrochemical gas separator cells.

The heated process air flows through at least one flow control valve downstream of the anode heat recovery heat exchanger but upstream of the plurality of solid oxide electrochemical gas separator cells.

Oxygen molecules in the heated process air entering the cathode of the plurality of solid oxide electrochemical gas separator cells are reduced. Resulting oxygen ions are conducted across the electrolyte to the anode; the oxygen ions are recombined into oxygen molecules in the anode; and the oxygen molecules are expelled from the anode in the resulting oxygen-enriched air stream.

The oxygen-enriched air is routed from the anode of the plurality of solid oxide electrochemical gas separator cells to a burner configured to heat the oxygen-enriched air through the combustion of fuel, wherein the burner is upstream of the second side of the anode heat recovery heat exchanger and the fuel is supplied from a fuel tank.

The oxygen-depleted air being routed to the second location is cooled below 80 degrees Celsius.

The second location is the ullage of a fuel tank.

The second location is a fire suppression system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
   a system inlet configured to receive a stream of incoming air;
   a first electrical heater receiving a first portion of the stream of incoming air and expelling a stream of cooling air;
   a second electrical heater receiving a second portion of the stream of incoming air and expelling a stream of process air;
   a solid oxide electrochemical gas separator system comprising:
      an anode side configured to receive the stream of cooling air from the first electrical heater and to produce oxygen enriched air; and
      a cathode side configured to receive the stream of process air from the second electrical heater and to produce oxygen depleted air; and
   a system outlet configured to release the oxygen depleted air from the cathode side.

2. The system of claim 1, further comprising a cathode heat recovery heat exchanger comprising:
   a cold side configured to receive and heat the stream of incoming air; and
   a hot side configured to receive and cool the oxygen-depleted air from the cathode side.

3. The system of claim 2, further comprising an anode heat recovery heat exchanger comprising:
   a cold side configured to receive and heat air from the cathode heat recovery heat exchanger; and
   a hot side configured to receive and cool the oxygen-enriched air from the anode side.

4. The system of claim 1, wherein the stream of incoming process air is selected from the group consisting of engine bleed air, compressed air, ram air, cabin air, and fan air.

5. The system of claim 1, further comprising a burner configured to receive and combust the oxygen-enriched air from the anode side.

6. The system of claim 1, further comprising a motor-assisted turbocharger configured to pressurize the stream of incoming air.

7. The system of claim 1, further comprising a compressor configured to pressurize the stream of incoming air.

* * * * *